United States Patent [19]

Thornton

[11] Patent Number: 4,718,251

[45] Date of Patent: Jan. 12, 1988

[54] DE-CONTAMINATED FLUID SUPPLY APPARATUS AND CRYOGENIC COOLING SYSTEMS USING SUCH APPARATUS

[75] Inventor: John Thornton, Enfield, England

[73] Assignee: British Aerospace, England

[21] Appl. No.: 29,680

[22] Filed: Mar. 24, 1987

[30] Foreign Application Priority Data

Mar. 24, 1986 [GB] United Kingdom ............... 8607224
May 6, 1986 [GB] United Kingdom ............... 8611033

[51] Int. Cl.⁴ ............................................. F25B 43/04
[52] U.S. Cl. ....................................... 62/475; 62/500; 62/514 JT
[58] Field of Search ............... 62/100, 500, 268, 116, 62/474, 475, 555, 514 JT; 55/269

[56] References Cited

U.S. PATENT DOCUMENTS 3,276,216 10/1966 Papapanu .............................. 62/475
3,630,051 12/1971 Martin .................................. 62/55.5
3,670,519 6/1972 Newton ................................. 62/116
3,902,330 9/1975 Power .................................. 62/55.5
3,933,003 1/1976 Markum ............................. 62/514 JT Primary Examiner—Ronald C. Capossela
Attorney, Agent, or Firm—Stevens, Davis, Miller & Mosher

[57] ABSTRACT

Disclosed is a cryogenic cooling system for supplying decontaminated fluid including a first duct for receiving the fluid, a second duct for providing decontaminated fluid. A contaminant remover decontaminates fluid flowing between the first and second duct, the flow being caused by a fluid flow generator. Also, included is a valve for changing over the flow direction such that the fluid flow generator alternately can operate in a regeneration mode to provide a low pressure gaseous environment for the contaminant remover. Various embodiments of the invention permit open and/or closed loop operation.

7 Claims, 7 Drawing Figures

DE-CONTAMINATED FLUID SUPPLY APPARATUS AND CRYOGENIC COOLING SYSTEMS USING SUCH APPARATUS

This invention relates to apparatus for supplying de-contaminated fluid, for example, a gas such as air, and to a cooling system, for example, a Joule-Thomson cooling system incorporating such apparatus.

Joule-Thomson cryogenic coolers are typically used in equipment carried by vehicles and aircraft to, for example, cool the detecting element of infra red detectors. Such coolers require a supply of compressed air which has been purified by having water, carbon dioxide and hydrocarbon vapours removed from it. At present such pure compressed air is supplied from gas bottles charged to high pressure. After each sortie or excursion these bottles are replaced with a freshly charged bottle. The depleted bottles are recharged by a ground based compressor with the compressed air being purified by having the water vapour, carbon dioxide and hydrocarbon vapours removed from its by passage through a filter, a desiccant and absorbent chemicals. The desiccant and absorbent chemicals have to be regularly replaced or regenerated by heating while being purged with pure dry air. Some materials, particularly desiccants, can, alternatively, be baked in a vacuum oven.

The logistics involved in refilling and in the replacement of the compressed air bottles are tedious and time consuming and it is therefore desirable to be able to provide some self-contained source of pressurised pure air to drive a Joule-Thomson cooler. Various proposals have been made for a small high pressure compressor together with associated filters, desiccants and absorbers to replace the conventional air bottles. However, a module containing the filter, absorbent and desiccant has a limited life when this is reduced to a small size capable of being fitted conveniently into an aircraft or vehicle. Thus there is only a limited advantage in providing the compressor on the aircraft or vehicle.

According to the present invention there is provided apparatus for supplying de-contaminated fluid, the apparatus comprising:
 a first duct portion for receiving fluid,
 a second duct portion at which the apparatus supplies de-contaminated fluid,
 contaminant removed means for de-contaminating fluid flowing from the first to the second duct portions;
 fluid flow generating means for causing said fluid to flow from the first to the second duct portions via the contaminant remover means; and
 valve means, including a changeover valve connected between the fluid flow generating means and the contaminant remover means, for rendering the said fluid flow generating means alternatively operable to produce a low pressure gaseous environment for said contaminant remover means and to thereby at least facilitate the in-situ regeneration of the contaminant remover means.

The apparatus may be operable or supplying de-contaminated gas, for example, air. Then the fluid flow generating means may comprise a compressor having an inlet and an outlet while the changeover valve may be arranged to connect the compressor outlet to the contaminant remover to cause gas to flow therethrough to the second duct portion, and alternatively to connect the compressor inlet to the contaminant remover to produce said low-pressure environment. Such a de-contaminated gas supply apparatus may form part of a cooling system, for example, the second duct portion may be connected to a Joule-Thomson cryogenic cooler which produces a cooling effect by allowing the gas to expand through a nozzle or the like. In one embodiment of such cooling apparatus described herein, the gas is air, the first duct portion receives air from the atmosphere, the air exiting from the Joule-Thomson cooler is released to the atmosphere, and the valve means further includes a stop valve between the second duct portion and the cooler. For cooling, the stop valve is open and the changeover valve is set for the compressor to draw air in via the first duct portion and to supply it to the contaminant remover from whence it flows through the second duct portion and stop valve to the cooler. For regeneration, the stop valve is closed and the changeover valve is switched so the compressor now produces at least a partial vacuum around the contaminant remover. In a second described embodiment, the air exiting from the cooler passes to a reservoir and thence to the first duct portion via a stop valve. During cooling this valve is open and the compressor draws air from the reservoir and drives it through the contaminant remover to the cooler from whence it is returned to the reservoir. For regeneration, the stop valve is closed and the changeover valve is set so the compressor now draws air from the reservoir backwards through the cooler and contaminant remover to provide a purge air stream over the contaminant remover.

In a third described embodiment, the fluid flow generating means comprises a compressor and an ejector pump, i.e. vacuum pump of the widely known kind in which fluid flowing at substantial speed through a mixing cavity produces a suction effect within a cavity and draws gas into the cavity via an entry at say the side of the cavity. Such pumps are used in laboratories for example, where they are simply connected to a water tap and water flowing from the tap through the pump provides the suction effect. In other situations, the fluid through the pump is steam. In the third embodiment, for cooling, the changeover valve is set so that the compressor simply draws air in through the first duct portion from the atmosphere and supplies it via the contaminant remover and a stop valve to the Joule-Thomson cooler, the ejector pump being inoperative at this time. For regeneration, the stop valve is closed and the changeover valve is switched to connect the compressor air outlet to the drive fluid inlet of the ejector pump and to connect the suction entry of the pump to the contaminant remover. Compressed air from the compressor then flows through the ejector pump and sucks air through its suction entry to produce an at least partial vacuum around the contaminant remover. The third embodiment could be modified to include the air reservoir and re-positioned stop valve as described for the second embodiment.

The de-contaminated fluid supply apparatus need not be coupled to a Joule-Thomson cooler or any cooling apparatus. Instead it may be used to provide a supply of de-contaminated fluid for some other purpose. For example, it might be used to supply gas for the aforementioned charging and re-charging of the gas bottles which are then taken away and installed say on an aircraft to drive a Joule-Thomson cooler therein. The fluid is not necessarily a gas and, if it is a gas, it is not necessarily air.

A heater may also be included in the contaminant remover to encourage the removal of contaminants during regeneration. Typically the contaminant remover contains absorbent material such as a molecular sieve desiccant to remove both water vapour and carbon dioxide from the compressed air and active carbon to absorb hydrocarbon vapours and other unwanted components. It is also possible to include hygroscopic materials and others which have an adsorbent effect which is reversible on being subjected to a low pressure.

Three examples of cooling systems in accordance with this invention will now be described with reference to the accompanying drawings which, apart from FIG. 7, are all block diagrams:

Figure 1:
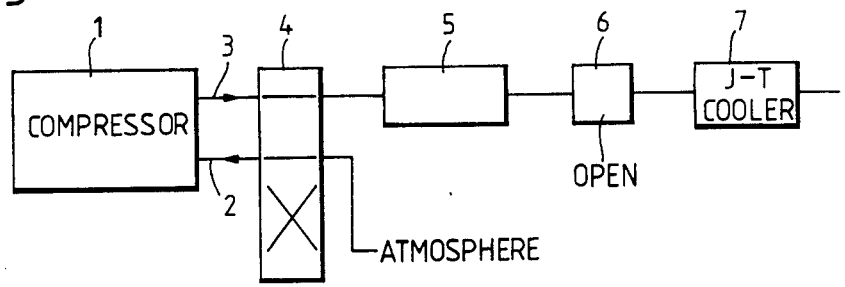
FIG. 1 shows the first example in its cooling mode.

The first example is an open-cycle system and includes a compressor 1 having an inlet 2 and an outlet 3, a changeover valve 4 and a contaminant remover 5. The compressor 1 is usually dry-lubricated and typically has a working pressure of 200 bars. If intended to be used on a land based vehicle the compressor 1 is typically a three stage compressor and if intended to be used in aircraft it is typically a pressure vessel packed with an adsorbent desiccant such as molecular sieve type 4A or 5A which adsorbs both water vapour and carbon dioxide and an adsorbent material such as active carbon to adsorb hydrocarbon vapours and other contaminants. The contaminant remover 5 also contains a mechanical filter to remove particulate matter. The contaminant remover 5 is connected via a solenoid valve 6 to a Joule-Thomson cooler 7 which, typically consists of finned helically would capillary tubing terminating in a gas expansion nozzle. The tubing is mounted in a Dewar vessel so that air expanded through the nozzle cools and precools the compressed air in the tubing. In use the Joule-Thomson cooler liquefies the pure air fed to it. Water, carbon dioxide and other contaminants of the air must be reduced to levels below 1 or 2 parts per million by the contaminant remover 5 to prevent them blocking the gas expansion nozzle.

With the changeover valve 4 in its first position as shown in FIG. 1 air is drawn from the atmosphere by the compresser 1 through the inlet 2, is compressed, and then passed through the contaminant remover 5 where water, carbon dioxide and hydrocarbon vapours are removed from it together with any particulate material. It then passes through the open solenoid valve 6 to the Joule-Thomson cooler 7 in which it expands, and cools to cool equipment connected to the Joule-Thomson cooler. The air is then exhausted to atmosphere. Typically, at the start of operation the valve 6 is held closed until, the compressor has built up to its working pressure.

Figure 2:
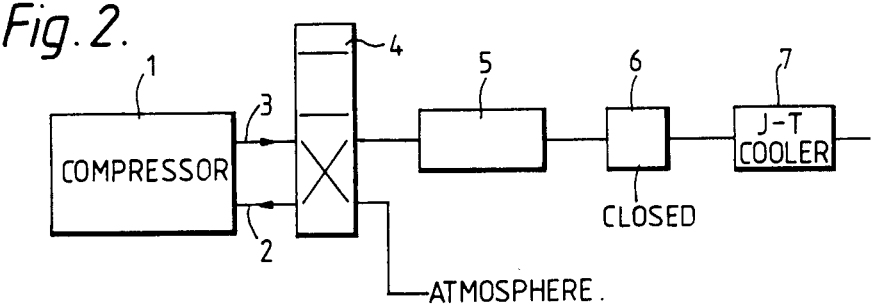
FIG. 2 shows the first example in its regeneration mode.

After use, to regenerate the adsorbent material in the vessel, the compressor 1 is stopped and the high pressure air in the vessel is allowed to dissipate. Then the changeover valve 4 is moved into its second position as shown in FIG. 2 and the solenoid valve 6 is closed. Then, the compressor 1 is started and draws air through its inlet 2 from the vessel and exhausts it via its outlet 3 to atmosphere. This evacuates the vessel and the contaminants desorb from the surface of the molecular sieve and active carbon material. Preferably electrical heating coils are included in the vessel to heat the adsorbent material and this helps to desorb the contaminants from it.

The second example is a nominally closed system and is generally similar to the first example and has the same reference numerals applied to its similar components. In this second example the outlet from the contaminant remover 5 is fed directly to the Joule-Thomson cooler 7 and the outlet from this is fed to an air reservoir 8. The outlet of the air reservoir is then connected to the inlet of the compressor 2 via the solenoid valve 6. An inlet from the atmosphere is also connected to the inlet 2 of the compressor 1 to provide air for the initial charging and any make-up.

In its cooling mode air compressed in the compressor 1 is fed through the contaminant remover 5 and through the cooler 7. The exhaust from the cooler 7 which is at substantially atmospheric pressure is fed to the air reservoir 8 and recycled to the inlet 2 of the compressor 1 via the solenoid valve 6. To regenerate the adsorbent material in the pressure vessel the compressor 1 is stopped and the high pressure allowed to dissipate. The solenoid valve 6 is then closed and the changeover valve 4 operated to connect the inlet 2 of the compressor 1 to the remover 5. Operation of the compressor 1 then reduces the pressure inside the pressure vessel to encourage desorbtion of the contaminants from the surface of the absorbent material and also, pure air is drawn from the air reservoir 8 via the expansion nozzle of the Joule-Thomson cooler 7 to provide a purge stream through the vessel at low pressure. The contaminants are vented from the outlet 3 of the compressor to the atmosphere. Again electrical heating coils may be included in the bed of absorbent material to enable it to be heated to encourage desorption of the contaminants.

Figure 5:
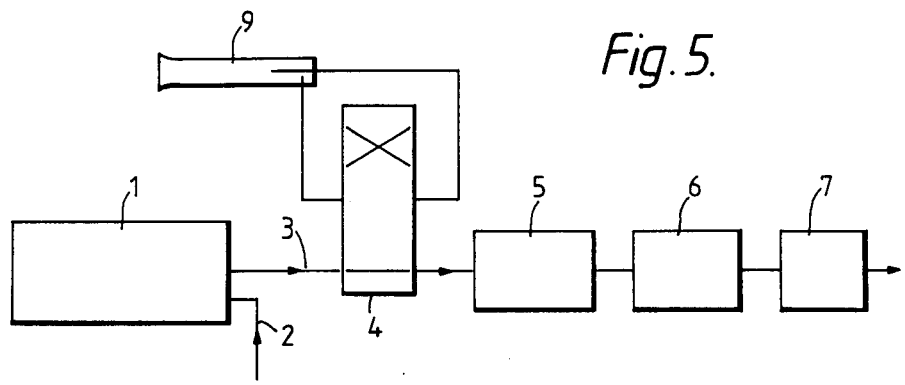
FIG. 5 shows the third example in its cooling mode.
Figure 6:
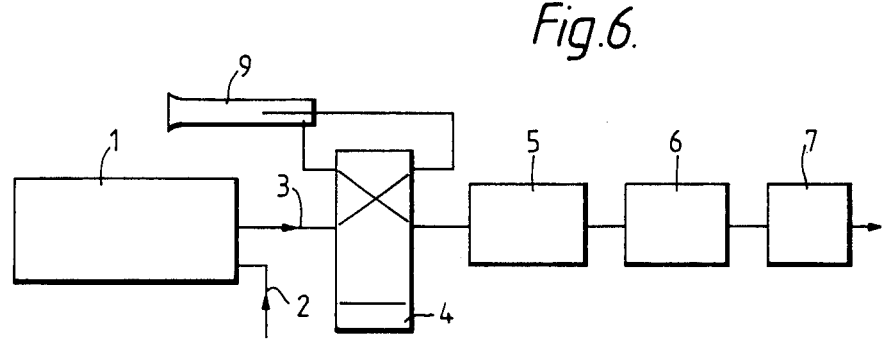
FIG. 6 shows the third example in its regeneration mode.
Figure 7:
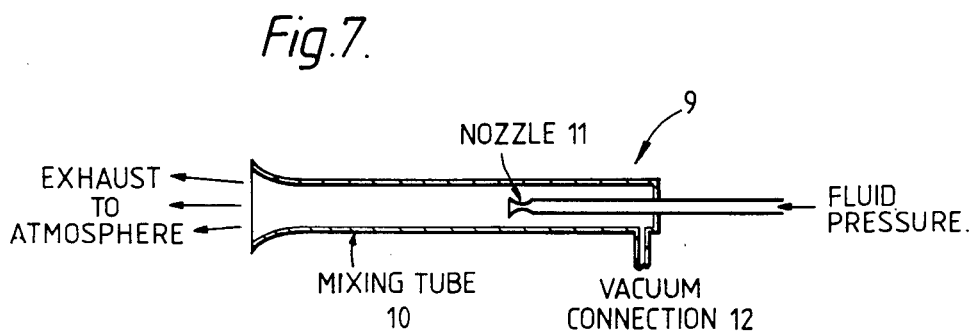
FIG. 7 is a diagrammatic sectional view of an ejector pump.

In the case of a compressor of a design which is unsuitable for operation as a vacuum pump, an alternative arrangement shown in figure 5 and 6 may be used in which the compressor operates normally in both modes of use. This makes use of an ejector pump 9 which, as shown in FIG. 7, comprises a tube 10 into which a fluid is ejected from a nozzle 11 at high velocity. The fluid then exhausts to atmosphere. The fluid produces a suction effect within the tube which is communicated to a vacuum connection at the side of tube 10. Such pumps have been widely used in conjunction with a pressurised supply of steam or water, but will also operate from compressed air.

With the changeover valve 4 in its first (cooling) position as shown in FIG. 5, air is delivered from the compressor 1 to the Joule-Thomson cooler 7, as before.

To regenerate the contaminant remover (or filter) the changeover valve 4 is moved to its second position as shown in FIG. 6 and the solenoid valve is closed. The compressor is started and supplies compressed air to the ejector pump 9. This has preferably a convergent-divergent nozzle design to provide a supersonic air velocity from its exit cone. The small amount of air moving at high velocity mixes with the air in the tube, causing it to be ejected and thus reducing pressure in the region of the tube which is upstream of the nozzle. This evacuates the filter vessel and accelerates desorbtion of contaminants as before. As before, the contaminant remover may be heated during the regeneration phase.

Figure 3:
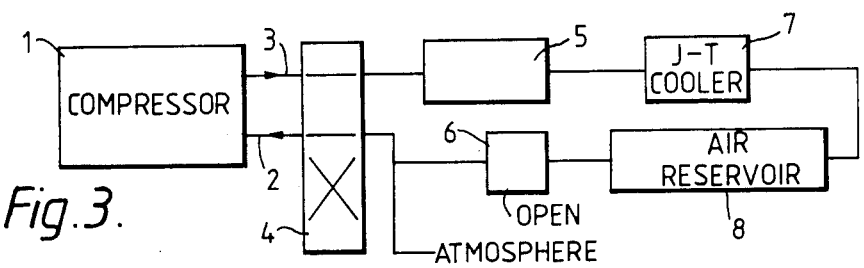
FIG. 3 shows the second example in its cooling mode.
Figure 4:
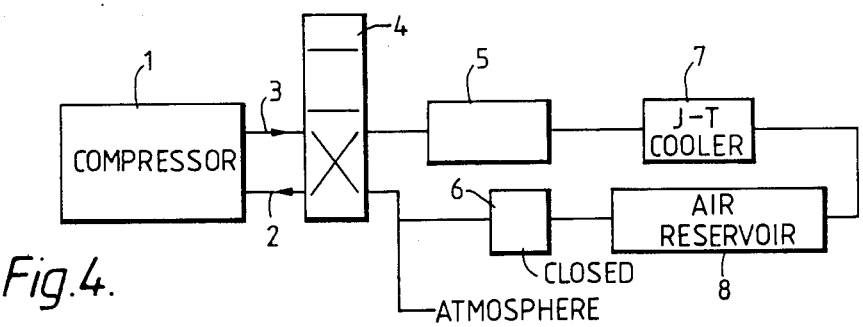
FIG. 4 shows the second example in its regeneration mode.

The embodiment of FIGS. 5 and 6 may be modified to a closed cycle system by the provision of an air reservoir at the outlet of cooler 7 and the re-positioning of valve 6 to between the reservoir and the inlet 2 of compressor 1, these items then operating in a manner similar to that described in connection with FIGS. 3 and 4.

I claim:

1. Apparatus for supplying de-contaminated fluid, the apparatus comprising:
   a first duct portion for receiving fluid,
   a second duct portion at which the apparatus supplies de-contaminated fluid.
   contaminant remover means for de-contaminating fluid flowing from the first to the second duct portions;
   fluid flow generating means for causing said fluid to flow from the first to the second duct portions via the contaminant remover means; and
   valve means, including a changeover valve connected between the fluid flow generating means and the contaminant remover means, for rendering the said fluid flow generating means alternatively operable to produce a low pressure gaseous environment for said contaminant remover means and to thereby at least facilitate the in-situ regeneration of the contaminant remover means.

2. Apparatus according to claim 1, the apparatus being operable for supplying de-contaminated gas, said fluid-flow generating means comprising a compressor having an inlet and an outlet, and said changeover valve means being operable for connecting the compressor outlet to the contaminant remover to cause gas to flow therethrough to the second duct portion, and alternatively for connecting the compressor inlet to the contaminant remover to produce said low pressure environment.

3. Joule-Thomson cryogenic cooling apparatus comprising de-contaminated gas supply means according to claim 2 and cooling means including an expansion port which is coupled to said second duct portion and which is operable for releasing said gas to expand and thereby produce a cooling effect.

4. Apparatus according to claim 3, wherein said first duct portion is open to receive air from the atmosphere, said cooling means comprises an outlet through which air released from the expansion port is subsequently released to the atmosphere, and the apparatus includes a stop valve connected between said second duct portion and said cooling means.

5. Apparatus according to claim 3, including an air reservoir connected to said cooling means to receive air which has been released through said expansion port, and also connected via a stop valve to said first duct portion.

6. Apparatus according to claim 1, wherein said fluid flow generating means comprises a gas compressor and an ejector pump, the compressor and ejector pump being connected to each other and to said contaminant remover means via said changeover valve and the changeover valve being operable for connecting the compressor outlet to the contaminant remover means, and alternatively for connecting the compressor outlet to the drive fluid inlet of the ejector pump and the suction inlet of the ejector pump to the contaminant remover means.

7. A Joule-Thomson cryogenic cooling system comprising a compressor, having an air inlet and a compressed air outlet, a changeover valve arranged to connect either the air inlet, or the air outlet to a contaminant remover and a Joule-Thomson cooler, the arrangement being such that, during cooling the air outlet of the compressor is connected to the contaminant remover to provide a flow of air from the contaminant remover through the Joule-Thompson cooler, the contaminant remover being regenerated by reversing the changeover valve to connect the air inlet of the compressor to the contaminant remover to lower the pressure in the contaminant remover to remove the contaminants from it.

* * * * *